3,549,574
ADHESIVE COMPOSITION
Colin W. Hawkins, Sarnia, Ontario, Canada, assignor to Polymer Corporation Limited, Sarnia, Ontario, Canada, a body corporate and politic
No Drawing. Filed Mar. 15, 1968, Ser. No. 713,321
Claims priority, application Canada, Apr. 19, 1967, 988,260
Int. Cl. C08d 9/12
U.S. Cl. 260—27
4 Claims

ABSTRACT OF THE DISCLOSURE

An improved adhesive composition suitable for spraying comprises a dispersion in a volatile organic liquid of:

(a) a cross-linked polymer of isobutylene,
(b) an elastomer, and
(c) a tackifying resin.

The cross-linked polymer (a) may be a cross-linked butyl rubber having from 50 to 90% by weight of gel. The cross-linked polymer is preferably masticated before it is dispersed and then mixed with preferably ⅓–5 parts of elastomer, e.g. butadiene-styrene copolymer, and 0.25 to about 10 parts of the tackifying resin, said parts being parts by weight per 1 part of cross-linked polymer.

---

The invention relates to adhesive compositions and, in particular, to adhesive cements containing cross-linked polymer of isobutylene and to a process for their preparation.

It is already known to use a polymer of isobutylene such as butyl rubber in the preparation of adhesive cements. The butyl rubber is a hydrocarbon soluble polymer which, when dissolved, produces an adhesive cement that is difficult to apply using conventional methods because of intensive fibrillation.

It is an object of this invention to provide an improved adhesive composition. Another object is to provide a process of preparing such improved adhesive composition.

It has now been found possible to prepare an improved adhesive composition using a cross-linked polymer of isobutylene in combination with a soluble elastomer such as butadiene-styrent copolymer. The cross-linked polymer os isobutylene contains at least about 20 percent by weight of gel and disperses in organic solvents such as toluene to produce a dispersion which is free of coarse gel particles; this dispersion can be sprayed without fibrillation using commercial spray applicators.

In accordance with the present invention, an improved adhesive composition is provided comprising a dispersion in a volatile organic liquid of a mixture comprising a cross-linked polymer of isobutylene, an elastomer and a tackifying resin, said polymer of isobutylene containing at least about 20 percent by weight of gel. The invention also provides a process of preparing an improved adhesive composition which comprises masticating a cross-linked polymer of isobutylene containing at least about 20 percent by weight of gel, dispersing said masticated polymer in a volatile organic liquid to produce a dispersion and incorporating in said dispersion an elastomer and a tackifying resin.

The term cross-linked polymer of isobutylene, used in this specification, is applied to copolymers of isobutylene and a small amount of a cross-linking monomer containing at least two independently polymerizable vinylidene groups. These copolymers are characterized by a gel content of at least about 20 percent by weight, preferably about 50 to 90 percent. Gel is determined by dispersing a few grams of the cross-linked polymer in about 100 milliters of an organic solvent such as toluene, separating the dispersion into a gel phase and a solution, and then determining the amount of polymer present in the solution. The gel content is then calculated from the difference between the amount of polymer used in the dispersion and the amount determined in the solution and is expressed as percent by weight of the cross-linked polymer of isobutylene. Representative examples of cross-linking monomers are ortho-, meta-, and para-divinyl benzenes, trivinyl benzenes, diallyl benzenes, p-allyl styrene, 2,4-dimethyl pentadiene-1,4 and mixtures thereof. However non-conjugated multiolefins can also be used. However, it is preferred to use an aromatic hydrocarbon having two vinyl groups attached to aromatic ring. The amount of the cross-linking monomer in the copolymer may vary from about 0.1 to about 5 mole percent, preferably from 0.3 to 3.0 mole percent. The preferred copolymers of isobutylene also contain units of copolymerized conjugated diolefins such as butadiene or isoprene. These units, present in a minor proportion of less than about 10 mole percent, provide the cross-linked copolymer with olefinic unsaturation which, if desired, can be used for further cross-linking.

The cross-linked polymer of isobutylene is known in the art and can be used in the form as produced in the polymerization process. However, it is preferred to masticate the polymer to make it uniformly dispersable in a volatile organic liquid and its dispersion in a solvent free of coarse particles and passable through the nozzle of spray applicator. The mastication may be carried out on a rubber mill or in a Banbury mixer at temperatures below about 120° C. The time of milling or masticating depends on the type and size of the equipment used, and the uniformity desired in the polymer; as little as three minutes is sufficient for some applications, while in others, carried out under more stringent conditions, milling time of 5–60 minutes is preferred.

The above polymer of isobutylene is dispersed in a volatile organic liquid which boils at temperatures below 150° C. at atmospheric pressure. Representative examples of the organic liquid are aromatic hydrocarbons such as benzene, toluene, xylenes; chlorinated hydrocarbons such as tetrachloroethane, ethylene dichloride, ethyl chloride; aliphatic hydrocarbons such as hexane, isooctane, cyclohexane; ketones such as methyl ethyl ketone; or mixtures thereof. The organic liquid is selected with a view for the specific use; for example a low boiling liquid is used when it is desired to effect a rapid drying of the composition. If, on the other hand, a viscous composition is desired, the organic liquid must be a good solvent for the soluble ingredients of the composition. The organic liquid is used in amounts of not less than about 80 percent by weight of the total composition. The preferable amount is about 95 percent by weight.

The composition of this invention also contains an elastomer and a tackifying resin. The elastomer is a high molecular weight non-resinous polymer of a conjugated diolefin, practically all soluble in the organic liquid. It may be a homopolymer of butadiene, isoprene or chloroprene or a copolymer of either of these diolefins with minor amount of a copolymerizable monoolefinic compound such as styrene, acrylonitrile or vinyl pyridine. The preferred elastomer, however, is a butadiene-styrene copolymer containing about 20–35 percent by weight of styrene and having a Mooney viscosity (M/L 4' at 100° C.) of about 40 to 60. The relative amount of the preferred elastomer may be varied within wide limits, from about ⅓ part by weight to not more than 5 parts by weight, per 1 part of the cross-linked polymer of isobutylene. When other than the preferred elastomer is used, the relative amount of the elastomer should not exceed about 2 parts by weight per 1 part of the cross-linked polymer.

The tackifying resin may be selected from a variety of soluble resin materials which are compatible, that is, miscible in all proportions with the cross-linked polymer of isobutylene. Representative examples of such resins are phenol-formaldehyde resins, coumarone-indene resins, terpene-phenolic resins, natural wood rosin or modified wood rosins such as polymerized wood rosin or glycerol rosin ester. The selection of a particular resin depends on the substrate to which the composition of this invention is applied and on the strength and/or flexibility of the adhesive bond desired. The proportion of the resin to the cross-linked polymer of isobutylene may vary from about 0.25:1 to about 10:1, on a weight basis. The preferable proportion is from 0.5:1 to 5:1.

The components of the adhesive composition of this invention may be mixed in any order as desired. However, it is preferred to disperse the cross-linked polymer of isobutylene in a part or total amount of the organic liquid. Any incompletely dispersed particles may be removed by filtering through e.g. glass wool. The elastomer and tackifying resin may be then incorporated in the solid form and dissolved in the dispersion of the cross-linked polymer; alternatively, they may be dissolved in a part of the organic liquid prior to adding to the dispersion and then the solution thereof mixed with the dispersion to produce the adhesive composition of this invention.

The invention is further illustrated by means of the following examples.

EXAMPLE I

An adhesive composition was prepared from a cross-linked polymer of isobutylene having a Mooney viscosity (M/L 9' at 125° C.) of 55, measured at 125° C. after 9 minutes of rotation using large rotor, and a gel content of 20 percent by weight. For the determination of gel, the polymer was suspended in cyclohexane, agitated at 20° C. for 48 hours and then the dispersion was filtered through a #541 Whatman filter paper. The amount of gel was calculated from the concentration of the polymer in the filtrate. This polymer of isobutylene was a copolymer prepared by copolymerizing at about −100° C. in methyl chloride diluent and in the presence of $AlCl_3$ catalyst a monomer mixture consisting of 100 parts by weight of isobutylene, 3 parts by weight of isoprene and 3 parts by weight of divinyl benzene. Prior to dispersing, the polymer was milled for 40 minutes at room temperature on a laboratory two roll mill at a setting of the gap between the rolls of about 0.5 mm.

25 grams of the above polymer was added to 810 grams of toluene and agitated at room temperature until a uniform dispersion was obtained. To this dispersion there was gradually added and dissolved 47 grams of a butadiene-styrene copolymer, 94 grams of wood rosin and 2 grams of 2,2-methylene bis-(4-methyl-6-tertiary butyl phenol), the antioxidant. The butadiene-styrene copolymer was a hot emulsion-polymerized, essentially all soluble, polymer containing 28 percent by weight of styrene and having a Mooney viscosity (M/L 4' at 100° C.) of 47. A smooth, uniform and fluid composition was obtained. This composition was sprayed onto a cotton duck fabric of 5 centimeters width, using a laboratory atomizer. The spray operation was smooth and free of fibrillation. After the toluene had evaporated, the cotton duck strips were bonded under pressure and then tested for peel strength. A force of 16.3 kilograms was required to peel off the strips.

A control experiment was carried out with an adhesive composition as above except for the omission of the cross-linked polymer of isobutylene. Severe fibrillation was observed when this composition was sprayed using the same laboratory atomizer.

EXAMPLE II

Four adhesive cements were prepared according to the procedure of Example I. These cements contained, dispersed in toluene, 3 percent by weight of non-volatile components shown in the following table. The amounts in the table are parts by weight per 100 parts of the cross-linked isobutylene polymer.

TABLE

| Composition | 1 | 2 | 3 | 4 |
|---|---|---|---|---|
| Cross-linked isobutylene polymer | 100 | 100 | 100 | 100 |
| Butadiene-styrene copolymer | 330 | 300 | 300 | 300 |
| Antioxidant | 4 | 4 | 4 | 4 |
| Wood rosin | | | | 140 |
| Alkyl-phenol formaldehyde resin | 140 | 280 | 140 | |

The cross-linked isobutylene polymer, used in this example, was a copolymer of isobutylene, isoprene and divinyl benzene containing 70 percent of gel. It was milled at room temperature for 10 minutes (compositions 1 and 2) and 60 minutes (compositions 3 and 4), respectively. The butadiene-styrene copolymer, antioxidant and wood rosin all were the same as in Example I. The alkyl-phenol formaldehyde resin was a heat-reactive resin having a melting point range of 144–162° available from Schenectady Chemicals, Inc. under the trade name SP–103 Resin.

All the cements were low viscosity dispersions which, when atomized, formed a spray practically free of fibrils. Compositions 3 and 4 were more uniform than compositions 1 and 2.

Additional cements were made using composition 4 in which the butadiene-styrene copolymer was replaced by the same amount of a butyl rubber and a butadiene-acrylonitrile copolymer, respectively. The butyl rubber was completely soluble in toluene and had a Mooney viscosity (M/L 8' at 100° C.) of 45 and the butadiene-acrylonitrile copolymer had an acrylonitrile content of 34 percent by weight and a Mooney viscosity (M/L 4' at 100° C.) of 83. These cements were fluid and uniform dispersions, but could not be sprayed without fibrillation.

What is claimed is:

1. An improved spray-adhesive composition comprising a dispersion in a volatile organic liquid of a mixture comprising: (a) a cross-linked polymer prepared by polymerizing a monomer system comprising isobutylene, less than 10 mole percent isoprene and from 0.1 to about 5 mole percent of a cross-linking monomer containing at least two independently polymerizable vinylidene groups, said polymer containing at least 20 percent by weight of gel; (b) a butadiene-styrene elastomeric polymer; and (c) a soluble tackifying resin selected from the group consisting of phenol-formaldehyde resins, coumarone-indene resins, terpene-phenolic resins, natural wood rosin and modified wood rosins, the proportion of cross-linked polymer (a) to copolymer (b) being from about 1/3:1 to not more than 5:1, in parts by weight.

2. The composition of claim 1 wherein the volatile organic liquid is present in an amount of not less than about 80 percent by weight of the composition, and wherein the proportion of the tackifying resin to the cross-linked polymer is from about 0.25:1 to about 10:1 on a weight basis.

3. The composition of claim 2 wherein the cross-linked copolymer is a copolymer of isobutylene/isoprene/divinyl benzene containing less than 10 mole percent isoprene units and from 0.1 to about 5 mole percent of divinyl benzene units.

4. The composition of claim 3 wherein the cross-linked copolymer contains from 50 to 90% gel.

References Cited

UNITED STATES PATENTS 3,068,191 12/1962 Seijo et al. _____ 260—880
3,264,232 8/1966 Lucke _____ 260—880

OTHER REFERENCES

Skeist: "Handbook of Adhesives," 1962 (pp. 221–228).

DONALD E. CZAJA, Primary Examiner

W. E. PARKER, Assistant Examiner

U.S. Cl. X.R.

260—32.8, 33.6, 33.8, 45.95, 82.1, 829, 846, 881